United States Patent Office 3,526,638
Patented Sept. 1, 1970

3,526,638
SUBSTITUTED 3,4-DIHYDRO-1H-2,1,5-BENZO-
THIADIAZOCINE-2,2-DIOXIDES
Otto Hromatka, Maximilian Knollmuller, and Dieter
Binder, Vienna, Austria, assignors to Smith Kline &
French Laboratories, Philadelphia, Pa., a corporation
of Pennsylvania
No Drawing. Filed Oct. 5, 1967, Ser. No. 673,019
Int. Cl. C07d 99/00
U.S. Cl. 260—327                                 8 Claims

ABSTRACT OF THE DISCLOSURE

6 - phenyl - 3,4 - dihydro - 1H - 2,1,5 - benzothiadiazocine-2,2-dioxides generally prepared by ring closure of appropriate sulfonamidobenzophenones are tranquilizers. The benzo ring may be chloro or trifluoromethyl substituted, the 1-nitrogen atom may be alkylated and the 5-nitrogen atom may be oxidized with perbenzoic acid or epoxidized to the 5,6-epoxy derivative by ultraviolet irradiation of the 5-oxide.

This invention relates to novel substituted 3,4-dihydro-1H-2,1,5-benzothiadiazocine-2,2-dioxides which have useful pharmacodynamic activity. More specifically the compounds of this invention have tranquilizing activity as demonstrated in standard laboratory animals. For example central nervous system depression, such as decreased motor activity, is observed in rats following oral doses of 200 mg./kg. At this dose level no toxicity is encountered.

The 3,4 - dihydro-1H-2,1,5-benzothiadiazocine-2,2-dioxides of this invention are represented by the following general structural formulas:

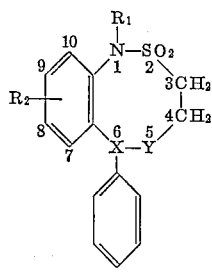  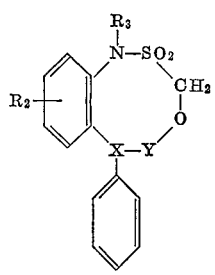

FORMULA I             FORMULA II wherein, $R_1$ represents hydrogen or lower alkyl having from 1 to 4 carbon atoms;

$R_2$ represents hydrogen, chlorine or trifluoromethyl and being in the 8- or 9-ring position;

$R_3$ represents lower alkyl having from 1 to 4 carbon atoms; and $>X—Y$ represents $>C=N$, $>C=N\rightarrow O$ or

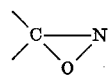

Preferred compounds of this invention having tranquilizing activity are represented by Formula I above when $>X—Y$ represents $>C=N$ or $>C=N\rightarrow O$.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, ethanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

Compounds of Formula I wherein $R_1$ is lower alkyl and $R_2$ is as defined above are prepared according to the following synthetic method:

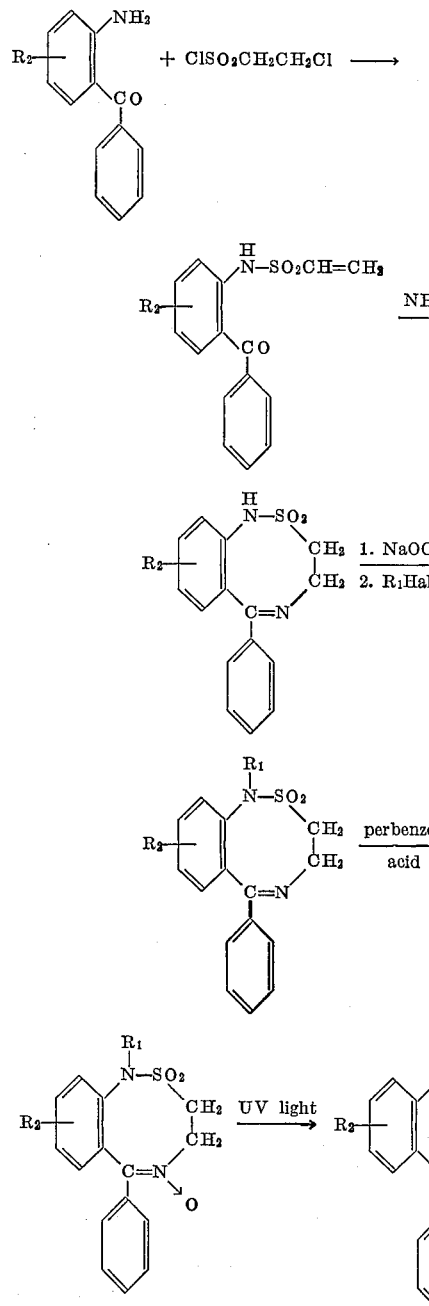

Thus the known 2-aminobenzophenone is reacted with β-chloroethylsulfonyl chloride in the presence of a tertiary amine at low temperature to yield the 2-vinylsulfonamidobenzophenone. The latter is treated wtih ammonia in a water-free solvent, for example ethanol, to give the ring closed 2,1,5-benzothiadiazocine. Alkylation of the nitrogen in the 1-position is accomplished by reaction of the sodium salt with an appropriate alkyl halide, preferably the iodide, in an unreactive solvent, for example in dimethylformamide. Oxidation to the N-oxide is attained by the action of an appropriate oxidizing agent, for example perbenzoic acid. The N-oxide is transformed into the epoxide by extended irradiation with ultraviolet light.

Compounds of Formula II wherein $R_2$ and $R_3$ as defined above are prepared according to the following method:

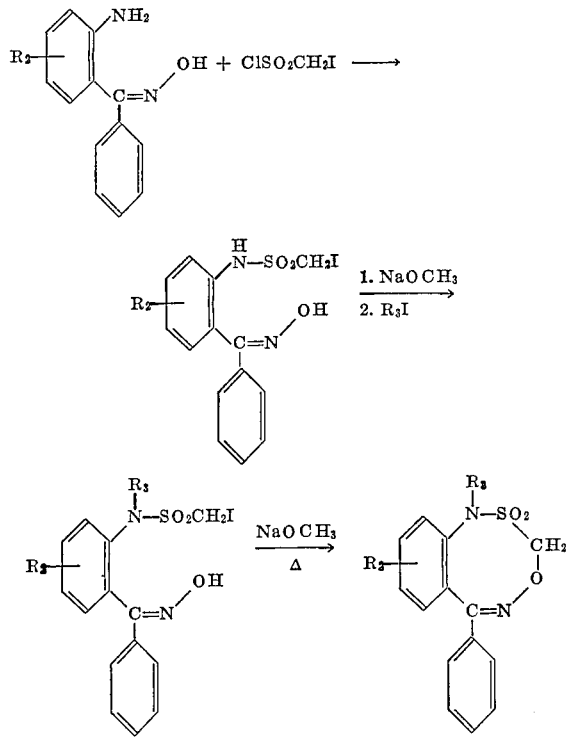

Thus the known 2-aminobenzophenone-α-oxime is reacted with iodomethylsulfonyl chloride in pyridine with cooling to yield the sulfonamide which is alkylated via the sodium salt with an appropriate alkyl iodide in dimethylformamide. The cyclization is accomplished in methanolic solution with an equimolar amount of sodium methoxide by evaporating to dryness and brieiffly heating the residue obtained in dimethylformamide. Similar oxidation and irradiation wtih ultraviolet light yields the corresponding products of Formula II.

The compounds of this invention may be administered orally or parenterally in conventional dosage unit forms such as tablets, capsules, injectables or the like, by incorporating the appropriate dose of a compound of Formulas I and II, or an appropriate salt thereof, with carriers according to accepted pharmaceutical practices. In view of the structural relationship and similar utility of the compounds of this invention to the well-known benzodiazepine series of pharmacological agents, details of their use will be obvious to those skilled in the art.

The foregoing is a general description of how to prepare and use the compounds of this invention. The following examples illustrate the preparation of specific compounds having tranquilizing activity. However this should not be construed as limiting the scope of the invention since appropriate variations in the starting materials will produce other corresponding products set forth in Formulas I and II.

EXAMPLE 1

(a) A solution of 9.9 g. of 2-aminobenzophenone and 10.1 g. of triethylamine in 360 ml. of absolute ether is added, at —50° C., to a solution of 8.1 g. of β-chloroethylsulfonyl chloride. After warming to —20° C. over a one hour period, the reaction mixture is treated with ice-cold 2 N hydrochloric acid solution, the layers separated and the ether layer water-washed. The latter is extracted with 2 N sodium hydroxide solution and the extract acidified and extracted with ether to yield 2-vinylsulfonamidobenzophenone, M.P. 67–69° C.

Similarly from the reaction of equimolar amounts of the appropriate 2-aminobenzophenone and β-chloroethylsulfonyl chloride in water-free pyridine at —35 to —45° C. there is obtained 5-chloro-2-vinylsulfonamidobenzophenone, M.P. 90–91° C.; 4-trifluoromethyl-2-vinylsulfonamidobenzophenone, M.P. 100–101° C.; and 5-trifluoromethyl - 2 - vinylsulfonamidobenzophenone, M.P. 83–84° C.

(b) A solution of 7.2 g. of 2-vinylsulfonamidobenzophenone in absolute ethanol is added to 400 ml. of 14% absolute ethanolic ammonia solution and allowed to stand at room temperature for four days. Concentration to 50 ml. yields 6-phenyl-3,4-dihydro-1H-2,1,5-benzothiadiazocine-2,2-dioxide,M.P. 256–258° C.

Similarly there is obtained:

6-phenyl-8-chloro-3,4-dihydro-1H-2,1,5-benzothiadiazocine-2,2-dioxide, M.P. 245–246° C.;
6-phenyl-8-trifluoromethyl-3,4-dihydro-1H-2,1-benzothiadiazocine-2,2-dioxide, M.P. 243–244° C.; and
6-phenyl-9-trifluoromethyl-3,4-dihydro-1H-2,1,5-benzothiadiazocine-2,2-dioxide, M.P. 208–209° C.

EXAMPLE 2

A solution of 1.43 g. of 6-phenyl-3,4-dihydro-1H-2,1,5-benzothiadiazocine-2,2-dioxide in absolute methanol is treated with 5.5 ml. of 1 N methanolic sodium methoxide solution and evaporated to dryness. The residue is taken up in dimethylformamide, treated with 1.5 ml. of methyl iodide and allowed to stand at room temperature for several hours. The solvent is evaporated and the residue is taken up in chloroform and dilute sodium hydroxide solution. The chloroform solution is evaporated to give 1-methyl-6-phenyl-3,4-dihydro-1H - 2,1,5 - benzothiadiazocine-2,2-dioxide, M.P. 135–136° C.

Similarly there is obtained:

1-methyl-6-phenyl-8-chloro-3,4-dihydro-1H-2,1,5-benzothiadiazocine-2,2-dioxide, M.P. 204–205° C.;
1-n-propyl-6-phenyl-8-chloro-3,4-dihydro-1H-2,1,5-benzothiadiazocine-2,2-dioxide, M.P. 170° C.;
1-methyl-6-phenyl-8-trifluoromethyl-3,4-dihydro-1H-2,1,5-benzothiadiazocine-2,2-dioxide,M.P. 188–189° C.;
1-ethyl-6-phenyl-8-trifluoromethyl-3,4-dihydro-1H-2,1,5-benzothiadiazocine-2,2-dioxide, M.P. 168–170° C.;
1-n-propyl-6-phenyl-8-trifluoromethyl-3,4-dihydro-1H-2,1,5-benzothiadiazocine-2,2-dioxide, M.P. 169–170° C.; and
1-methyl-6-phenyl-9-trifluoromethyl-3,4-dihydro-1H-2,1,5-benzothiadiazocine-2,2-dioxide, M.P. 179–180° C.

EXAMPLE 3

A solution of 4.3 g. of 6-phenyl-3,4-dihydro-1H-2,1,5-benzothiadiazocine-2,2-dioxide in chloroform, at 30–40° C., is treated with twice the molar amount of perbenzoic acid in chloroform and allowed to stand at room temperature for 24 hours. The reaction mixture is shaken with saturated sodium bicarbonate solution and the dried chloroform solution is concentrated to 40 ml. at reduced pressure. Addition of ether separates 6-phenyl-3,4-dihydro-1H - 2,1,5 - benzothiadiazocine-2,2,5-trioxide, M.P. 256–257° C.

Similarly there is obtained:

6-phenyl-8-chloro-3,4-dihydro-1H-2,1,5-benzothiadiazocine-2,2,5-trioxide, M.P. 248–250° C.;
1-methyl-6-phenyl-3,4-dihydro-1H-2,1,5-benzothiadiazocine-2,2,5-trioxide, M.P. 191–193° C.;
1-methyl-6-phenyl-8-chloro-3,4-dihydro-1H-2,1,5-benzothiadiazocine-2,2,5-trioxide, M.P. 247° C.;
1-n-propyl-6-phenyl-8-chloro-3,4-dihydro-1H-2,1,5-benzothiadiazocine-2,2,5-trioxide, M.P. 198–200.5° C.;
1-methyl-6-phenyl-8-trifluoromethyl-3,4-dihydro-1H-2,1,5-benzothiadiazocine-2,2,5-trioxide, M.P. 288–290° C. (decomp.);

1-ethyl-6-phenyl-8-trifluoromethyl-3,4-dihydro-1H-2,1,5-benzothiadiazocine-2,2,5-trioxide, M.P. 236–238° C. (decomp.);

1-n-propyl-6-phenyl-8-trifluoromethyl-3,4-dihydro-1H-2,1,5-benzothiadiazocine-2,2,5-trioxide, M.P. 179–182° C.; and 1-methyl-6-phenyl-9-trifluoromethyl-3,4-dihydro-1H-2,1,5-benzothiadiazocine-2,2,5-trioxide, M.P. 230–233° C. (decomp.).

EXAMPLE 4

A solution of 1.0 g. of 6-phenyl-8-chloro-3,4-dihydro-1H-2,1,5-benzothiadiazocine-2,2,5-trioxide in 500 ml. of ethanol is irradiated with ultraviolet light in an open flask until the solution is concentrated to about 100 ml. Complete evaporation of the solvent yields 5,6-epoxy-6-phenyl-8-chloro - 3,4,5,6 - tetrahydro-1H-2,1,5-benzothiadiazocine-2,2-dioxide, M.P. 169–172° C.

Similarly there is prepared 1-methyl-5,6-epoxy-6-phenyl-8-chloro-3,4,5,6-tetrahydro-1H-2,1,5 - benzothiazocine-2,2-dioxide, M.P. 151.5–153.5° C.

EXAMPLE 5

To a solution of 20.0 g. of 5-chloro-2-amino-benzophenone-α-oxime in 170 ml. of water-free pyridine at 0° C. is added 19.5 g. of iodomethylsulfonyl chloride over a period of 20 minutes. After standing for one hour at 0° C. the reaction mixture is concentrated at a bath temperature of 35° C. and taken up in ether and 2 N hydrochloric acid solution. The ether solution is shaken with 2 N hydrochloric acid solution, dried and evaporated to give 5 - chloro-2-iodomethylsulfonamido-benzophenone-α-oxime, M.P. 163–165° C. A solution of the latter in absolute methanol is treated with one equivalent of 1 N methanolic sodium methoxide solution and evaporated to dryness. The residue is taken up in dimethylformamide, an excess of methyl iodide is added and allowed to stand for one hour. The mixture is concentrated at reduced pressure and the residue is taken up in ether and 0.5 N sodium hydroxide solution. The dried ether layer is evaporated to give 5 - chloro - 2 - (N - methyl-iodomethylsulfonamido)-benzophenone-α-oxime. The latter (6.1 g.) is dissolved in 14.2 ml. of 1 N methanolic sodium methoxide solution and then evaporated to dryness at reduced pressure. The residue is dissolved in 125 ml. of dimethylformamide and heated for 15 minutes on the water bath. After concentration at reduced pressure the reaction mixture is taken up in water and ether. The dried ether layer is evaporated to yield 1-methyl-6-phenyl-8-chloro-1H,3H-4,2,1,5-benzoxathiadiazocine-2,2-dioxide, M.P. 199–210° C.

EXAMPLE 6

Exemplary of the tranquizing activity exhibited by the products of this invention are the results obtained with 1 - n - propyl - 6-phenyl-8-trifluoromethyl-3,4-dihydro-1H-2,1,5-benzothiadiazocine-2,2-dioxide. The compound administered orally to rats as doses of 200 mg./kg. produced a decrease in motor activity and hypotonia during a five hour period of observation. No toxicity was observed.

What is claimed is:

1. A chemical compound or a pharmaceutically acceptable acid addition salt thereof, said compound having one of the following formulas:

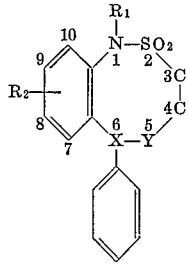 and 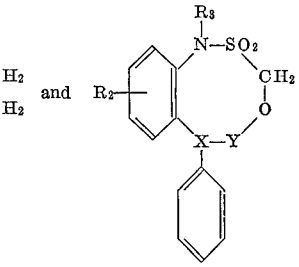

FORMULA I         FORMULA II in which:
$R_1$ is hydrogen or lower alkyl having from 1 to 4 carbon atoms;

$R_2$ is hydrogen, chlorine or trifluoromethyl in the 8- or 9-ring position;

$R_3$ is lower alkyl having from 1 to 4 carbon atoms; and

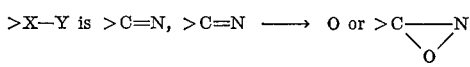

2. A chemical compound according to claim 1 having the Formula I.

3. A chemical compound according to claim 2 in which >X—Y is >C=N or >C=N→O.

4. A chemical compound according to claim 3 in which >X—Y is >C=N.

5. A chemical compound according to claim 4 in which $R_2$ is 8-chloro or 8-trifluoromethyl.

6. A chemical compound according to claim 5 in which $R_1$ is hydrogen and $R_2$ is 8-chloro, being the compound 6 - phenyl - 8 - chloro - 3,4-dihydro-1H-2,1,5-benzothiadiazocine-2,2-dioxide.

7. A chemical compound according to claim 5 in which $R_1$ is n-propyl and $R_2$ is 8-trifluoromethyl, being the compound 1-n-propyl-6-phenyl-8-trifluoromethyl-3,4-dihydro-1H-2,1,5-benzothiadiazocine-2,2-dioxide.

8. A chemical compound according to claim 1 having the Formula II in which $R_2$ is 8-chloro, $R_3$ is methyl and >X—Y is >C=N, being the compound 1-methyl-6-phenyl - 8 - chloro-1H,3H - 4,2,1,5-benzoxathiadiazocine-2,2-dioxide.

References Cited

UNITED STATES PATENTS 3,464,996    9/1969    Wright et al. _____ 260—293.4

JAMES A. PATTEN, Primary Examiner

U.S. Cl. X.R.

204—158; 260—556; 999